United States Patent [19]

Swartzlander

[11] Patent Number: 5,271,425
[45] Date of Patent: Dec. 21, 1993

[54] VALVE CLOSING APPARATUS RESPONSIVE TO MOVEMENT

[76] Inventor: Kenneth R. Swartzlander, 540 Harding Rd., Corona, Calif. 91719

[21] Appl. No.: 65,111
[22] Filed: May 20, 1993
[51] Int. Cl.⁵ .............................................. F16K 17/36
[52] U.S. Cl. .................................................... 137/46
[58] Field of Search ...................... 137/38, 39, 45, 46

[56] References Cited

U.S. PATENT DOCUMENTS

| | | |
|---|---|---|
| 2,054,563 | 9/1936 | Hansen. |
| 2,585,316 | 2/1952 | Hobson. |
| 3,888,271 | 6/1975 | Pettit. |
| 4,103,697 | 8/1978 | Kiesow. |
| 4,531,533 | 7/1985 | Coombes et al.. |
| 4,852,600 | 8/1989 | Asbra ...................................... 137/46 |
| 4,889,313 | 12/1989 | Sanchez. |

FOREIGN PATENT DOCUMENTS 154567 9/1982 Japan ..................................... 137/46

*Primary Examiner*—Robert G. Nilson
*Attorney, Agent, or Firm*—Harold L. Jackson

[57] ABSTRACT

A fully automatic valve closing apparatus that is responsive to movement between the apparatus and a substantially fixed structure, wherein the apparatus includes a supporting frame on which is mounted a pressure activated actuator which is adapted to be fixedly mounted to a main in-line valve of a fluid flow system such as a gas or water utility line. A gas pressure activating system is operably interconnected between the fixed structure by means of a tripping mechanism defining a universal linkage device that removably engages a pair of pressure control valves. The main valve is moved to a closed position when movement occurs between the valve closing apparatus and the substantially fixed structure to which the universal linkage is movably attached. The apparatus which contains no electrical components is pneumatically operated from a self-contained power source.

23 Claims, 2 Drawing Sheets

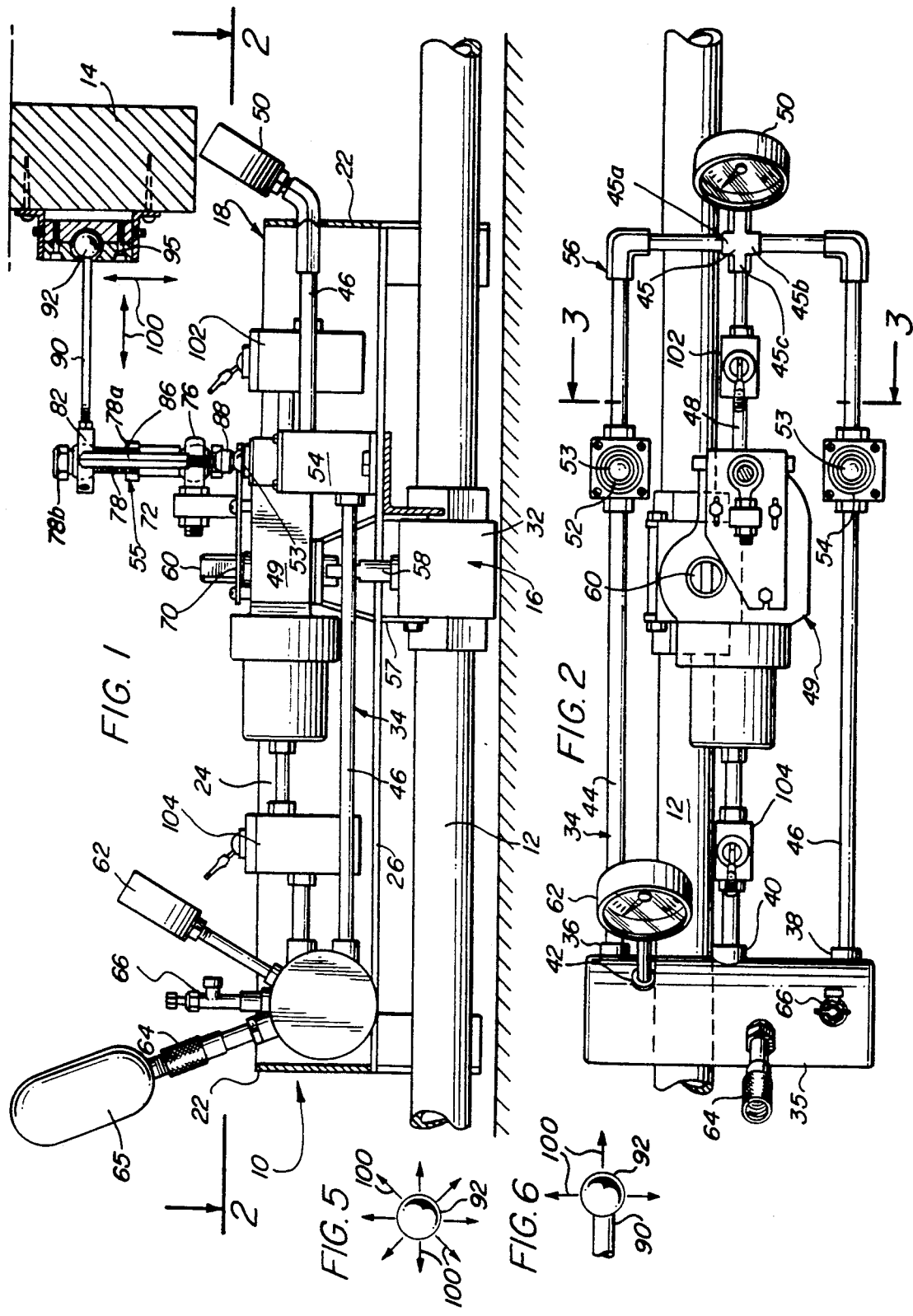

VALVE CLOSING APPARATUS RESPONSIVE TO MOVEMENT

FIELD OF THE INVENTION

The present invention relates generally to a valve closing apparatus that is responsive to movement of various kinds, and more particularly to an apparatus that includes a pressure activated actuator mounted to a main in line valve of a fluid flow system such as gas, water utility liquid chemical and petroleum product lines. A pressure activating system is interconnected between a substantially fixed structure by means of a universal linkage device that is defined by a tripping mechanism. The main valve is moved to a closed position when movement occurs between the valve closing apparatus and a substantially fixed structure to which the universal linkage is secured.

DESCRIPTION OF THE PRIOR ART

It is common knowledge that when major movements of building structures occur, particularly during a major earthquake, many appliances such as water heaters become dislodged or separated from their mountings and the fluid pipes of water and gas often break or are separated, causing a potentially very serious hazard. Uncontrolled flow of water often causes serious damage by flooding the surrounding area. A potential explosion is often possible from leaking gas. During large earth movements many people either do not know where the appropriate gas and water shutoff valves are located or they panic, forgetting to shut down the various valves that control the utilities provided in homes, offices and other types of building structures. Further, there are many different types of utilities valves and most of these operate in a particular manner, requiring specific tools to open and close them. That is, many valves require tools that are specifically designed with a particular handle and/or a corresponding socket to match a valve stem. This creates difficulties for the homeowner or those who are charged with the operation of such valves. Some known valves are designed to be self-operating or are provided with automatic operating devices so that a valve of this type may be located in a remote area not easily accessible. In this regard, one may refer to the following United States patents that disclose various self-operating valves and safety sensor devices that are associated with such valves.

In U.S. Pat. No. 2,054,563 to S. H. Hansen there is disclosed a shutoff valve that is interposed in a pipeline and includes a valve mechanism having a pendulum-like member which is triggered by earthquakes or other shocks. The movement of the pendulum in any direction causes the internal mechanism of the valve to close, thus preventing further flow of fluid through the line in which the valve is positioned.

U.S. Pat. No. 2,583,316 to O. J. Hobson discloses a shock activated fluid valve having a ball chamber wherein a ball is positioned above the valve set. The ball is adjustably positioned in the ball chamber by means of an adjusting screw so as to control the sensitivity of the operation.

In U.S. Pat. No. 3,888,271 to M. G. Pettit there is disclosed a motion-responsive shutoff valve characterized by an axially displaced, spring-loaded closure plug seated in a valve housing that includes a lever arm member operated by a fulcrum for restraining a closure plug. Other safety sensor devices are found in U.S. Pat. No. 4,103,697 to H. L. Kiesow, U.S. Pat. No. 4,531,533 to G. E. Commbes and A. J. Lemonie, and U.S. Pat. No. 4,888,313 which is a utility shutoff method and device disclosed by Robert Sanchez.

SUMMARY OF THE INVENTION

The apparatus of the present invention defines a pressure activated motion detection apparatus that is responsive to various structural movements, particularly those movements caused by various seismic disturbances such as earthquakes, large explosions or other types of disturbances that cause movement between a fixed structure and the apparatus. The apparatus is provided with a frame member on which is mounted a pressurized tank having a closed conduit system defined by a pair of inter-connected outlet pipes that are joined together at an intermediate junction to an input conduit that is connected to an input port of a pneumatic actuator. At least one and preferably both outlet pipes are provided with an in-line pressure control valves which are normally closed by a universal connector or linkage device that is removably mounted to engage each respective in-line pressure control valve and to a substantially fixed building structure. The actuator may be operated by either a pneumatic or hydraulic system, and it is operably mounted to an ON and OFF main valve interposed in a pipeline for carrying gas, water liquid chemicals or petroleum products or the like employed in building structures such as homes, office buildings, chemical and petroleum processing plants.

Accordingly, the main in-line valve of the pipeline system is automatically closed when the tripping mechanism or linkage device is separated from each of the in-line pressure control valves. This separation causes the valves to automatically open and allow pressurized fluid to flow through the conduits, whereby the pneumatic actuator is activated to close the main utility valve, thereby shutting down fluid flow in the utility pipeline.

It should be understood that the present invention is not limited to just utility flow systems, but can also be adapted for many commercial types of fluid-flow systems such as found in chemical plants and the like.

It is an important object of the present invention to provide a valve closing apparatus operated remotely by a pressurized closed-circuit system that is activated by linkage leg members of the universal linkage which is interconnected between the pneumatic system and the substantially fixed structure e.g., in the form of a building wall.

Still another object of the present invention is to provide a tripping means that includes various linkage members to establish a universal movement between the members so that any movement of the members in any direction, upwardly, downwardly, sideward, or horizontally back and forth, will cause linkage leg members to disengage from the respective pressure control valves This allows the pressure control valves to open, allowing pressure from the charged storage tank to activate the pneumatically operated actuator so as to rotate the main in-line fluid-flow ball valve from an open position to a closed position.

Yet another object of the present invention is to provide a remotely positioned valve closing apparatus that can be operated with either a liquid or gas-type pressurized system.

A further object of the present invention is to provide an apparatus of this character that is relatively easy to install and simple but rugged in construction.

The characteristics and advantages of the invention are further sufficiently referred to in connection with the accompanying drawings, which represent one embodiment. After considering this example, skilled persons will understand that variations may be made without departing from the principles disclosed; and I contemplate the employment of any structures, arrangements or modes of operation that are properly within the scope of the appended claims.

BRIEF DESCRIPTION OF THE DRAWINGS

Novel features and advantages of the present invention in addition to those mentioned above will become apparent to those skilled in the art from reading the following detailed description in conjunction with the accompanying drawings wherein:

FIG. 1 is a side-elevational view of the present invention which is shown mounted to a main fluid-flow pipeline and interconnected to a substantially fixed structure by means of a universal linkage device;

FIG. 2 is a top plan view of FIG. 1 taken a substantially along line 2—2 thereof;

FIG. 5 is a front view of the ball member connected to the universal linkage device with arrows illustrating the multi-directional movement thereof; and FIG. 6 is a side elevational view of the ball 92 and a portion of connecting arm 90 with arrows further illustrating the range of ball movement.

DETAILED DESCRIPTION OF THE INVENTION

Referring more particularly to FIG. 1, there is shown a side-elevational view of the present invention defined as a valve closing apparatus responsive to movement between two substantially fixed structures, the apparatus being generally indicated at 10. The two fixed structures are illustrated herein as a fluid flow pipeline 12 and a fixed structure member 14 which may represent the wall of a building or the like. The fluid flow pipeline includes a main in-line valve 16 such as a MISER ® two-way-flow ball valve manufactured by Worcester Controls. The valve closing apparatus is secured to the flow pipeline 12 in a suitable manner such as being attached to main ball valve 16, as illustrated in FIGS. 1 through 4, and will hereinafter be referred to in detail.

Figure 3:
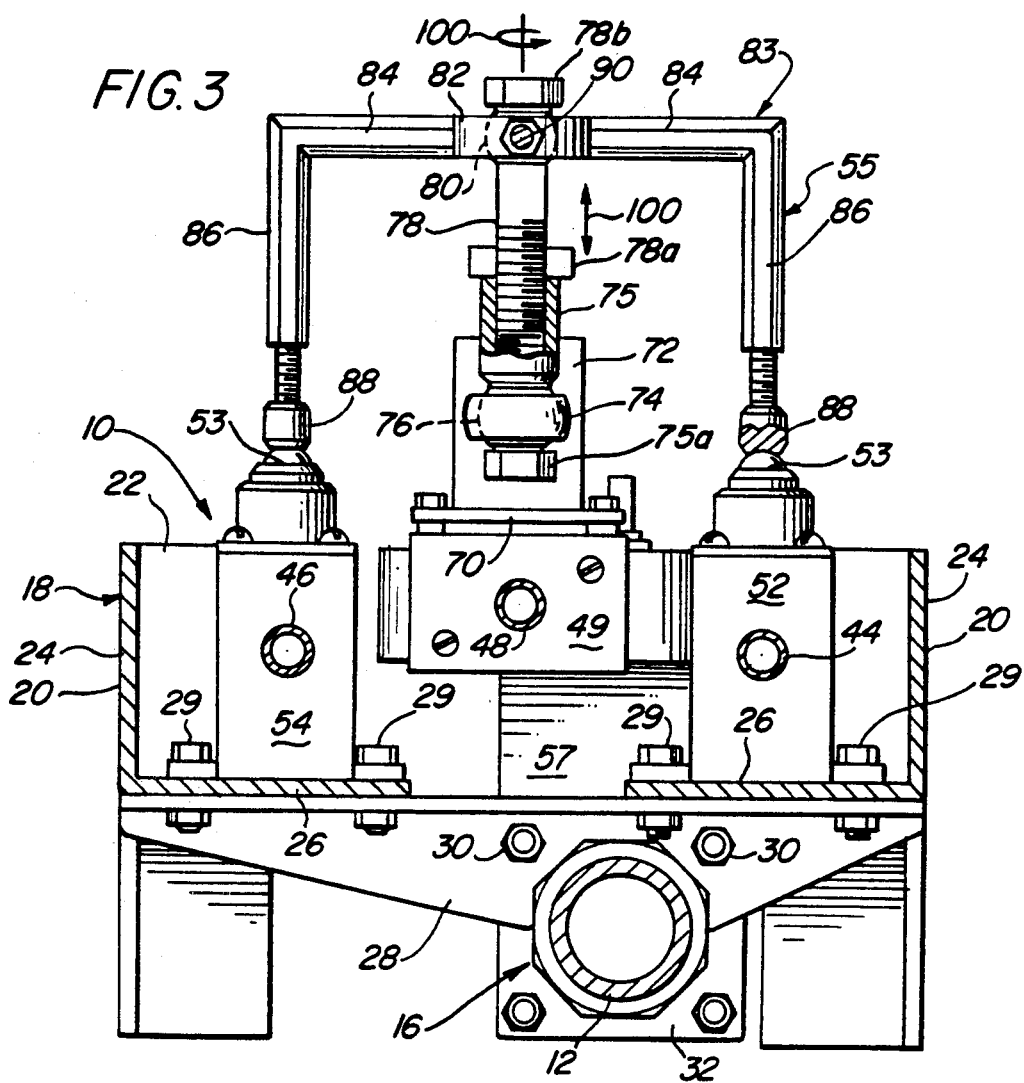
FIG. 3 is an enlarged cross-sectional view taken substantially along line 3—3 of FIG. 2.

Accordingly, the valve closing apparatus comprises a box like support structure, indicated at 18, defined by a pair of oppositely positioned, spaced-apart, longitudinal frame members 20 that are connected together at their opposite ends by end members 22. Each longitudinal frame member 20 is formed having an L-shaped configuration defined by an upright side member 24 and a flat horizontal bottom member 26. The longitudinal frame members 20 are also connected by means of a transverse bracket member 28 which is positioned so as to be mounted to main valve 16, as seen in FIG. 3 of the drawings. Bracket member 28 is attached to the underside of the oppositely disposed flat horizontal bottom members 26 by suitable means such as bolts 29. When mounting support structure 18 to flow pipeline 12, bracket 28 is secured to the front side of main valve 16 by suitable means such as bolts 30 which are provided within the body 32 of main ball valve 16. In addition, the end members 22 may also be suitably secured to the sections of the pipe spaced from the valve 16 by suitable brackets (not shown).

Mounted within support structure 18 is a pressurized fluid flow system, generally indicated at 34, which comprises a tank 35 adapted to maintain a high pressure throughout the pressurized system by means of liquid or gas stored therein. Tank 35 includes forwardly positioned outlet ports 36, 38 and 40 and rearwardly facing port 42. Port 36 is adapted to receive conduit or pipe 44 which extends forwardly from tank 35 to a first port 45a of a four-way junction coupling 45. Port 38 is also adapted to receive a conduit or pipe 46 which extends forward from tank 35 and is secured in a second port 45b of coupling 45. An outlet conduit or pipe 48 is mounted at one end to the rearward facing third port 45c and at its opposite end to an actuator means, designated at 49. The fourth port 45d of coupling 45 is provided so as to receive a pressure gauge 50 which faces rearwardly of the support structure 18 and operates to provide a pressure reading only when fluid flows through valves 52 and 54 or when a leak occurs in either of the valves so that fluid flows downstream of the valves.

In order to control the pressurized fluid flow from tank 35, conduits 44 and 46 are provided with suitable pressure control valves 52 and 54, respectively. These valves are fixedly mounted to horizontal bottom members 26 and are each defined as a 3-way, 2-position, remote pressure valve manufactured by the Parker Valve company. Each of these valves is provided with ball actuators 53 biased in an upward position by an internal spring 53a (shown in FIG. 4). Valves 52 and 54 are interposed within their respective conduits 44 and 46 which are located between tank 35 and the junction coupling 45, and are generally arranged in a normally open mode when not engaged. That is, each valve is forcibly closed when the ball actuators 53 are depressed by a tripping means, indicated generally at 55 and are open when the ball actuators are forced upwardly by the internal spring. Thus, fluid pressure from tank 35 is prevented from entering downstream of the forward portion of the closed conduit circuit, designated at 56, and reaching actuator means 49. A suitable actuator means comprises a pneumatic actuator such as one produced by Worcester Controls that is adapted to operate with the main ball valve heretofore mentioned.

As illustrated in FIG. 1, a mounting bracket 57 is secured to the main valve 16. Mounting bracket 57 extends upwardly and is attached to actuator 49 so as to support the actuator and supports the apparatus with respect to the main pipeline 12 either alone or in conjunction with the end members 22 as discussed previously. A valve stem 58 extends upwardly from ball valve 16 so as to be coupled with positioning pin 60 which is rotatably mounted within actuator 49. This arrangement allows both the actuator and the main valve to be reset to a closed position after actuator 49 and main valve 16 have been triggered to an open position or visa versa. The resetting of main valve 16 to a closed or open mode can be readily accomplished by rotating pin 60 with a wrench.

In order to enable an operator to determine the amount of pressure in tank 35 a second pressure gauge 62 is operably mounted to the tank as shown. A one-way pressure insert valve 64 is mounted to tank 35 along with a bleeder valve 66. Insert valve 64 is suitably adapted to receive fluids or gases such as provided by a conventional $CO_2$ cartridge 65.

Figure 4:
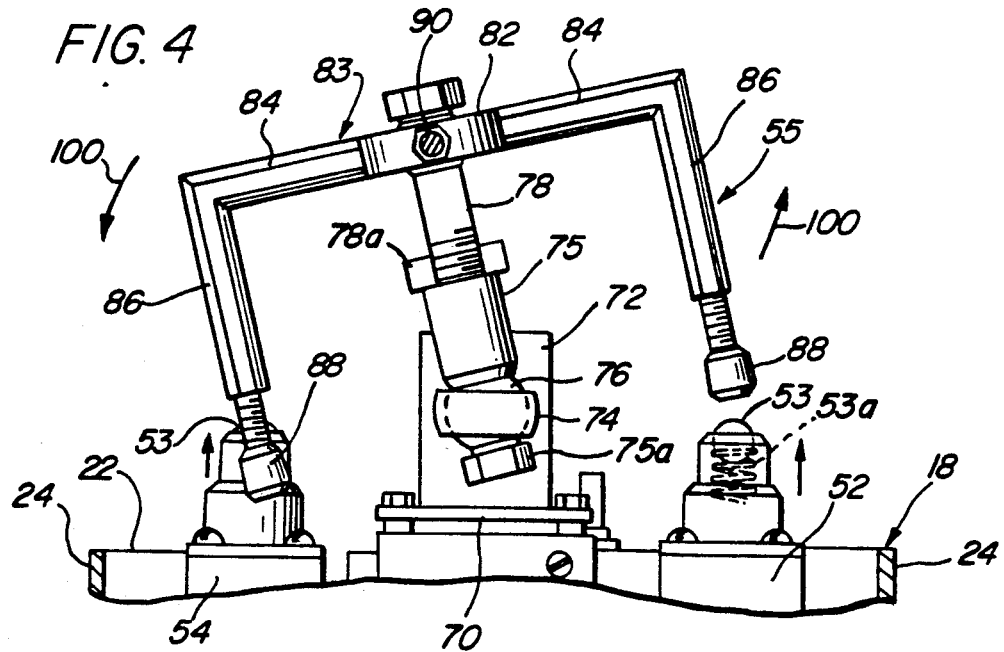
FIG. 4 is a front view of the universal linkage device shown disengaged from the oppositely disposed pressure control valves within the closed pressurized flow system of the apparatus.

The tripping means 55, as illustrated more particularly in FIGS. 1, 3, and 4, comprises a mounting plate 70 which is attached to actuator 49 by suitable means, and includes a mounting block 72 in which is mounted a rod end 74 that extends horizontally outwardly from the mounting block 72 and includes a spherical joint 76. A shaft 75 threaded internally at the top end and externally at the bottom end is mounted to spherical joint 76 by means of a nut 75a. A threaded pin 78 is adjustably fastened for universal movement in the top end of shaft 75 and secured thereto by lock nut 78a. Pin 78 extends upwardly and is attached to a second spherical joint 80 by nut 78b. A inverted U-shaped strut member, generally designated at 83 is attached to a collar 82 affixed to the outer roll of the spherical joint 80 by means of a set screw (not shown), a pair of horizontal bars 84 which extend outwardly on opposite sides of joint 82. Each bar 84 includes a depending leg member 86 oppositely arranged over respective ball-actuator members 53 of pressure valves 52 and 54. Each leg member 86 is provided with an adjustable shoe 88 which is adapted to engage ball actuator 53. Pin 78 and shoes 88 are adjustable so that the height of strut member 83 can be adjusted vertically to correspond to the height of the fixed structure 14. A linkage arm member 90 which includes a ball member 92 is secured to the collar 82 so as to be positioned at a right angle to bars 84. Ball member 92 is movably coupled to a support socket 95 which is fixedly mounted to the substantially fixed structure 14. When tripping shown in FIGS. 1 and 3, linkage pin 78 is vertically aligned with strut member 83, and arm member 90 is horizontally positioned between strut member 83 and structure 14. There is preferably a predetermined amount of clearance between the ball 92 and the socket 95 so that relative movement between the ball and socket must exceed a preset amount before the arm 90 is moved to disengage the shoes 88 from the ball actuator members 53 and open the valves 52 and 54 as will be described in more detail.

Accordingly, movement between the pipeline 12 and the fixed structure 14 beyond that allowed by the clearance between the ball and its socket will cause tripping means 55 to move as illustrated in FIG. 4. Thus, any multidirectional movement between structure 14 and pipeline 12, as indicated by directional arrows 100, will cause a correspondingly universal movement of the connected members of the tripping means, as indicated by arrows 100 in FIGS. 1, 3 and 4. The movement of the ball 90 along any of its three degrees of freedom (i.e., along one or more of the coordinates x, y, or z) will cause tripping means 55 to separate from its engagement with pressure valves 52 and 53, at which time these valves revert back to a normally open mode, thereby allowing fluid pressure to reach the ball valve actuator 49 which in turn rotates the main ball valve 16 to a closed position, thus closing down the fluid flow in pipeline 12 and preventing further escape of possible inflammable or other hazardous materials, gases or liquids from a ruptured pipe such as found in pipeline 12.

It should be noted that there are two additional air control valves 102 and 104 which are optional and are not necessary for the functioning of the apparatus. They are simply a means to demonstrate the operation and working principle of the invention. Each valve 102 and 104 when included in the system is normally positioned in an open mode to allow fluid flow to and from the pneumatic actuator 49.

To place the present invention in an operational mode, bleeder valve 66 is placed in a closed mode. Before fluid flow system 34 is pressurized the main ball valve 49 must be positioned in an open mode with the tripping means 55 properly mounted so as to close the two pressure valves 52 and 54. If the system includes the two air-control valves 102 and 104 they, too, must be positioned in an open mode. This now places the apparatus in a fully operational mode.

It may thus be seen that the objects of the present invention set forth herein, as well as those made apparent from the foregoing description, are efficiently attained While the preferred embodiment of the invention has been set forth for purpose of disclosure, modifications of the disclosed embodiment of the invention as well as other embodiments thereof may occur to those skilled in the art. For example, one of the valves 52 or 54 may be replaced with a simple ball or other member for engaging the shoe 88 of the respective leg member 86. The use of two pressure valves, however, serves a redundant function in case one valve fails to operate. Accordingly, the appended claims are intended to cover all embodiments which do not depart from the spirit and scope of the invention.

What is claimed is:

1. An apparatus for automatically turning a main ball valve in a fluid flow main pipeline when movement occurs between the pipeline and a fixed structure, the apparatus being interconnected between the pipeline and the fixed structure, said apparatus comprising:
   a pressurized fluid-flow system having at least one storage tank in which pressurized fluid is stored and at least one pressure control valve operably communicating with said storage tank;
   means mounted to said storage tank for charging said storage tank with said pressurized fluid;
   an actuating means operably coupled to the main ball valve in the fluid-flow pipeline and connected to said pressure control valve, whereby pressurized fluid from said storage tank activates said valve actuating means when said pressure control valve is positioned in an open mode;
   trigger means connected between said fixed structure and said apparatus so as to be positioned for engagement with said pressure control valve, thereby placing said pressure control valve in a closed mode, said trigger means being arranged to be disengaged from said pressure control valve upon movement between said apparatus and said fixed structure, thereby placing said pressure control valve in an open mode, whereby said actuator means rotates the main ball valve to a closed position for shutting down the fluid flow in the main pipeline.

2. An apparatus as recited in claim 1 wherein said pressurized fluid flow system includes at least one conduit connected between said storage tank and said actuator means said pressure control valve being interposed therein.

3. An apparatus as recited in claim 1 wherein said pressurized fluid flow system includes a first conduit and a second conduit, a first pressure control valve being interposed in said first conduit and a second pressure control valve being interposed in said second conduit, said first and second conduits being interconnected to a third conduit which is connected to said actuator means.

4. An apparatus as recited in claim 3 wherein said trigger means is defined as a universal linkage means positioned between the fixed structure and said first and second pressure control valves.

5. An apparatus as recite in claim 4 wherein said universal linkage means comprises:

a mounting plate attached to said actuator means having a mounting block secured thereto;

a first universal joint mounted to said mounting block;

an upright adjustable linkage member attached at one end to said first universal joint;

a second universal joint mounted to the opposite end of said upright adjustable linkage member;

a linkage arm extending outwardly from said second universal joint whereby said linkage arm is movably connected to said fixed structure;

a universal coupling means fixedly attached to said fixed structure and formed to receive one end of said linkage arm whereby a movable connection is defined between said linkage arm and said fixed structure.

6. An apparatus as recited in claim 5 wherein said trigger means includes means for removably engaging said pressure control valves.

7. An apparatus as recited in claim 6 wherein said first universal joint comprises a rod end attached to said mounting block, said rod end including a spherical joint mounted therein and having said upright adjustable linkage member fastened at one end to said spherical joint of said rod end for universal movement therewith.

8. An apparatus as recited in claim 7 wherein said second universal joint comprises a collar having a second ball spherical joint mounted therein, said linkage arm being secured to said collar and wherein said linkage arm includes a ball member movably coupled to said universal coupling means mounted to the fixed structure.

9. An apparatus as recited in claim 8 wherein said universal coupling means defines a support socket in which said ball member of said linkage arm is movably mounted.

10. An apparatus as recited in claim 5 wherein said means for removably engaging said pressure control valves comprises a pair of oppositely disposed depending leg members positioned for engagement with a pair of respective ball actuator members for said pressure control valves.

11. An apparatus as recited in claim 10 wherein each of said leg members is provided with an adjustable shoe positioned for engagement with said ball actuators whereby said pressure control valves are held in a closed mode until said shoes are disengaged from said ball actuators.

12. An apparatus as recited in claim 11 wherein said apparatus includes means for mounting said apparatus to the fluid flow main pipeline.

13. An apparatus as recited in claim 12 wherein said mounting means of said apparatus comprises a frame structure and at least one support bracket positioned for mounting said frame structure to the fluid flow main pipeline.

14. An apparatus as recited in claim 13 wherein said actuator means includes an actuator coupling means positioned to engage an extended valve stem of the main ball valve so as to position the main ball valve in either an open or closed mode.

15. An apparatus as recited in claim 12 wherein the actuator coupling means includes a positioning pin that is rotatably mounted in said actuator means so as to reset the main ball valve to an open mode after being activated to a closed mode.

16. An apparatus for closing a main valve in a fluid flow pipeline in response to a predetermined amount of movement along one or more of three coordinates between the pipeline and a fixed structure, the main valve having a rotatable stem which opens the valve in a first position and closes the valve in a second position comprising:

a source of gas under pressure;

pneumatic actuating means connected to the valve stem for rotating the stem between the first and second positions in response to pressurized gas;

at least one pressure control valve connected between the pressurized gas source and the pneumatic actuating means; and trigger means coupled between the fixed structure and the pressure control valve for operating the pressure control valve to connect the pressurized gas source to the pneumatic actuating means in response to said predetermined movement along one or more of three coordinates between the pipeline and the fixed structure.

17. The apparatus as recited in claim 16 wherein the pressure control valve includes a spring biased ball actuating member.

18. An apparatus as recited in claim 17 wherein the trigger means is defined as a universal linkage means.

19. An apparatus as recite in claim 18 wherein said universal linkage means comprises:

a mounting plate attached to said actuator means having a mounting block secured thereto;

a first universal joint mounted to said mounting block;

an upright adjustable linkage member attached at one end to said first universal joint;

a second universal joint mounted to the opposite end of said upright adjustable linkage member;

a linkage arm extending outwardly from said second universal joint whereby said linkage arm is movably connected to said fixed structure;

a universal coupling means fixedly attached to said fixed structure and formed to receive one end of said linkage arm whereby a movable connection is defined between said linkage arm and said fixed structure.

20. An apparatus as recited in claim 19 wherein said first universal joint comprises a rod end attached to said mounting block, said rod end including a ball bearing mounted therein and having said upright adjustable linkage member fastened at one end to said ball bearing of said rod end for universal movement therewith.

21. An apparatus as recited in claim 20 wherein said second universal joint comprises a spherical bearing mounted therein, said linkage arm being secured to said spherical bearing and wherein said linkage arm includes a ball member movably coupled to said universal coupling means.

22. An apparatus as recited in claim 21 wherein the pressure control valve includes a spring biased ball actuator and wherein the linkage arm further includes a strut member adjacent the second universal joint and extending outwardly and downwardly therefrom to the spring biased ball actuator.

23. An apparatus as recited in claim 22 wherein said at least one pressure control valve comprises a pair of pressure control valves, each pressure control valve having a spring biased ball actuator and wherein the strut member is in the form of an inverted U with each terminal end thereof engaging one of the spring biased ball actuators.

* * * * *

UNITED STATES PATENT AND TRADEMARK OFFICE
CERTIFICATE OF CORRECTION

PATENT NO. : 5,271,425
DATED : 12/21/93
INVENTOR(S) : SWARTZLANDER

It is certified that error appears in the above-identified patent and that said Letters Patent is hereby corrected as shown below:

Column 1, line 42, begin a new paragraph with the word
   --Some--.

Column 1, line 45, begin a new paragraph with the word --In--.

Column 1, line 68, begin a new paragraph with the word
   --Other--.

Column 2, line 60, after "valves" insert --.--.

Column 5, line 35, after "tripping" insert --means 55 is
   positioned in an upright locked mode, as--.

Column 6, line 17, after "tained" insert --.--.

Signed and Sealed this

Twenty-sixth Day of April, 1994

Attest:

BRUCE LEHMAN

Attesting Officer

Commissioner of Patents and Trademarks